United States Patent
Keidar et al.

(10) Patent No.: US 9,547,331 B2
(45) Date of Patent: Jan. 17, 2017

(54) APPARATUS AND METHOD TO SET THE SPEED OF A CLOCK

(71) Applicant: QUALCOMM Incorporated, San Diego, CA (US)

(72) Inventors: Ron Keidar, San Diego, CA (US); Michael K. Batenburg, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 14/244,626

(22) Filed: Apr. 3, 2014

(65) Prior Publication Data
US 2015/0286242 A1 Oct. 8, 2015

(51) Int. Cl.
*G06F 1/00* (2006.01)
*G06F 1/04* (2006.01)
*G06F 5/06* (2006.01)
*G06F 1/08* (2006.01)
*G06F 1/32* (2006.01)

(52) U.S. Cl.
CPC ............. *G06F 1/08* (2013.01); *G06F 1/324* (2013.01); *Y02B 60/1217* (2013.01)

(58) Field of Classification Search
CPC .............. G06F 1/04; G06F 1/08; G06F 1/324; Y02B 60/1217
USPC ................................. 713/300, 322, 500, 600
See application file for complete search history.

(56) References Cited

U.S. PATENT DOCUMENTS

| | | | |
|---|---|---|---|
| 7,640,446 B1 | 12/2009 | Donovan | |
| 7,721,127 B2 | 5/2010 | Vishin et al. | |
| 7,886,131 B1 | 2/2011 | Kang | |
| 8,250,395 B2 | 8/2012 | Carter et al. | |
| 8,539,132 B2* | 9/2013 | Gibson | G06F 13/36 710/104 |
| 2003/0084309 A1 | 5/2003 | Kohn | |
| 2006/0020831 A1 | 1/2006 | Golla et al. | |
| 2006/0212247 A1* | 9/2006 | Shimoyama | G06F 1/3203 702/89 |
| 2008/0028249 A1* | 1/2008 | Agrawal | G06F 1/3203 713/501 |
| 2008/0147357 A1 | 6/2008 | Truter | |
| 2009/0319759 A1 | 12/2009 | Rothman et al. | |
| 2011/0106992 A1 | 5/2011 | Lee et al. | |
| 2011/0239220 A1 | 9/2011 | Gibson et al. | |
| 2013/0007475 A1 | 1/2013 | Ganesan et al. | |

OTHER PUBLICATIONS

International Search Report and Written Opinion—PCT/US2015/023123—ISA/EPO—Jun. 8, 2015.
(Continued)

*Primary Examiner* — Mark Connolly
(74) *Attorney, Agent, or Firm* — Blakely Sokoloff Taylor & Zafman

(57) ABSTRACT

Disclosed is an apparatus and method to set the speed of a clock. A computing device may include a processor and a scheduler of the processor, the scheduler may be configured to: receive a plurality of votes for requested bandwidths from a plurality of different execution environments; sum the requested bandwidths; and set the clock speed based upon the sum of the requested bandwidths.

25 Claims, 4 Drawing Sheets

(56) References Cited

OTHER PUBLICATIONS

Peterson P, "Cryptkeeper: Improving Security with Encrypted RAM," Technologies for Homeland Security (HST), 2010 IEEE International Conference on, IEEE, Piscataway, NJ, USA, Nov. 8, 2010 (Nov. 8, 2010), pp. 120-126, XP031815946, ISBN: 978-1-4244-6047-2.
Swankoski E.J., et al., "A Parallel Architecture for Secure FPGA Symmetric Encryption," Proceedings—18th International Parallel and Distributed Processing Symposium, IPDPS 2004, Apr. 26-30, 2004; Santa Fe, NM, Apr. 30, 2004 (Apr. 30, 2004), pp. 132-139, XP055284204, US DOI: 10.1109/IPDPS.2004.1303101 ISBN: 978-0-7695-2132-9.

* cited by examiner

APPARATUS AND METHOD TO SET THE SPEED OF A CLOCK

BACKGROUND

Field

The present invention relates to an apparatus and method to set the speed of a clock.

Relevant Background

In a hardware environment that provides virtual ownership to multiple execution environments (EEs), many EEs may own a command interface (e.g., a hardware (HW) command interface). Each EE may assume that it is the sole user of the HW. If concurrent events/commands occur from various EEs, each of the EEs may experience performance degradation.

Traditional clock-voting mechanisms have been used for multiple users of HW. In this traditional clock-voting mechanism, different EE users of the HW vote to turn the HW clock on and for a particular clock speed. An aggregator of the votes selects the highest vote (i.e., the most requested speed). Traditionally, each EE manages its local voting without taking other EEs into account. Unfortunately, for some EEs the selected speed may be too low and the amount of resultant degradation may not be manageable for that particular EE.

SUMMARY

Aspects of the invention may relate to an apparatus and method to set the speed of a clock. A computing device may include a processor and a scheduler of the processor, the scheduler may be configured to: receive a plurality of votes for requested bandwidths from a plurality of different execution environments; sum the requested bandwidths; and set a clock speed based upon a sum of the requested bandwidths.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

As used herein, the term "computing system or device" refers to any form of programmable computer device including but not limited to laptop and desktop computers, tablets, smartphones, televisions, home appliances, cellular telephones, personal television devices, personal data assistants (PDA's), palm-top computers, wireless electronic mail receivers, multimedia Internet enabled cellular telephones, Global Positioning System (GPS) receivers, wireless gaming controllers, receivers within vehicles (e.g., automobiles), interactive game devices, notebooks, smartbooks, netbooks, mobile television devices, or any data processing apparatus.

Figure 1:
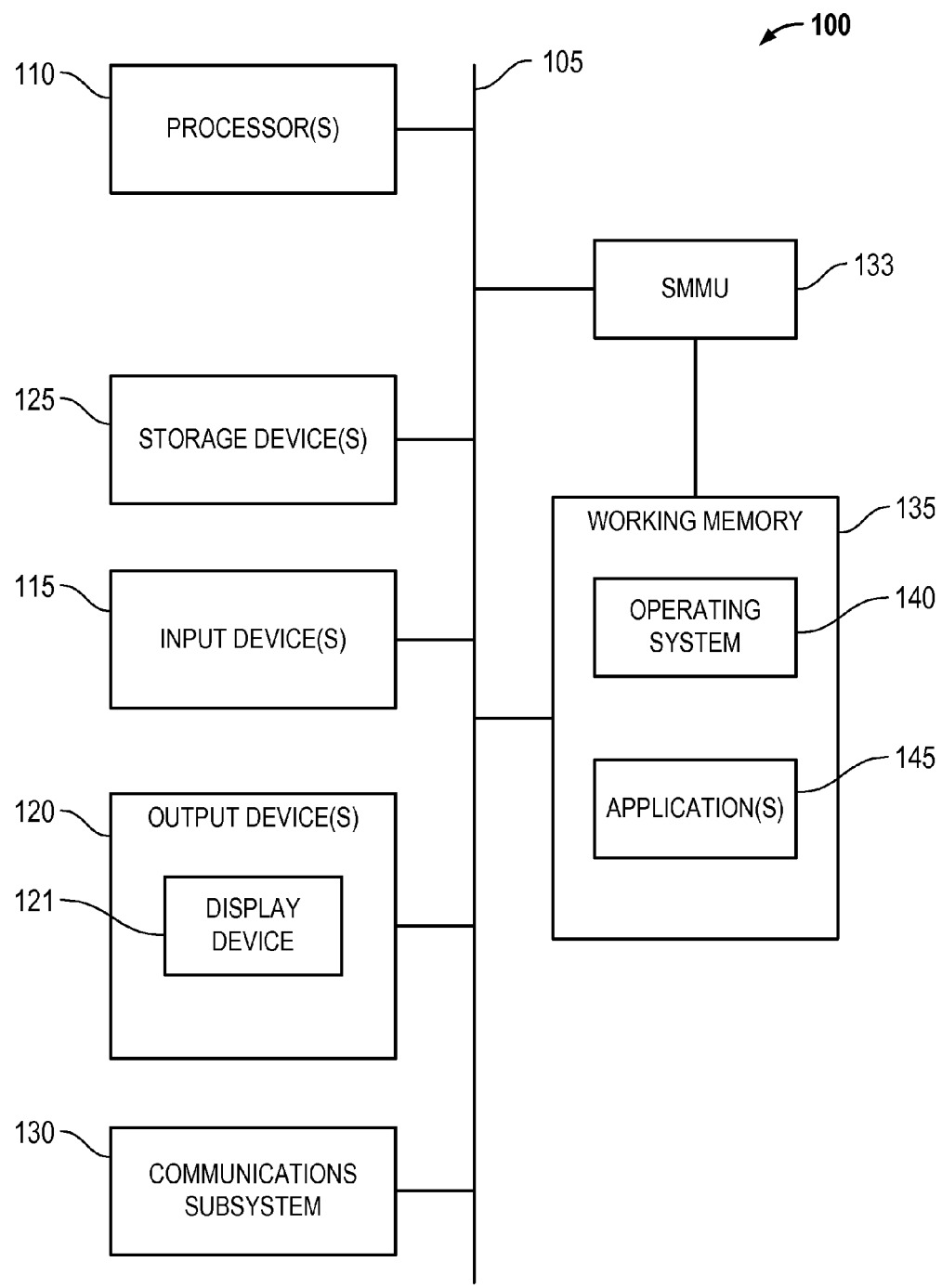
FIG. 1 is a diagram of a computing device in which aspects of the invention may be practiced.

An example computing device 100 that may be utilized to set the speed of a clock, in which aspects of the invention may be practiced, as will be hereinafter described in detail, is illustrated in FIG. 1. The computing device 100 is shown comprising hardware elements that can be electrically coupled via a bus 105 (or may otherwise be in communication, as appropriate). The hardware elements may include one or more processors 110, including without limitation one or more general-purpose processors and/or one or more special-purpose processors (such as digital signal processing chips, graphics acceleration processors, cryptoprocessors, and/or the like); one or more input devices 115 (e.g., keyboard, keypad, touchscreen, mouse, etc.); and one or more output devices 120, which include at least a display device 121, and can further include without limitation a speaker, a printer, and/or the like.

The computing device 100 may further include (and/or be in communication with) one or more non-transitory storage devices 125, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The computing device 100 may also include a communication subsystem 130, which can include without limitation a modem, a network card (wireless or wired), an infrared communication device, a wireless communication device and/or chipset (such as a Bluetooth device, an 802.11 device, a Wi-Fi device, a WiMax device, cellular communication devices, etc.), and/or the like. The communications subsystem 130 may permit data to be exchanged with a network, other computer systems, and/or any other devices described herein. In many embodiments, the computing device 100 will further comprise a working memory 135, which can include a RAM or ROM device, as described above. Further, the computing device 100 may include a system memory management unit (SMMU), which is a computer hardware unit that has memory references passed through it, and may be used to perform the translation of virtual memory addresses to physical addresses, in order to implement applications. The computing device 100 may also comprise software elements, shown as being currently located within the working memory 135, including an operating system 140, applications 145, device drivers, executable libraries, and/or other code.

Merely by way of example, one or more procedures described with respect to the method(s) discussed below may be implemented as code and/or instructions executable by a computing device (and/or a processor within a computing device); in an aspect, then, such code and/or instructions can be used to configure and/or adapt a general purpose computer (e.g., a computing device) to perform one or more operations in accordance with the described methods, according to embodiments of the invention. As one particular example, as will be described in more detail hereinafter, a processor 110 may implement embodiments of the invention to set the speed of a clock. A set of these instructions and/or code might be stored on a non-transitory computer-readable storage medium. In some cases, the storage medium might be incorporated within a computer device, such as computing device 100. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computerized computing device 100 and/or might take the form of source and/or installable code, which, upon compilation and/or installation on the computing device 100 (e.g., using any of a variety of generally available compilers, installation programs, compression/decompression utilities, etc.), then takes the form of executable code.

Figure 2:
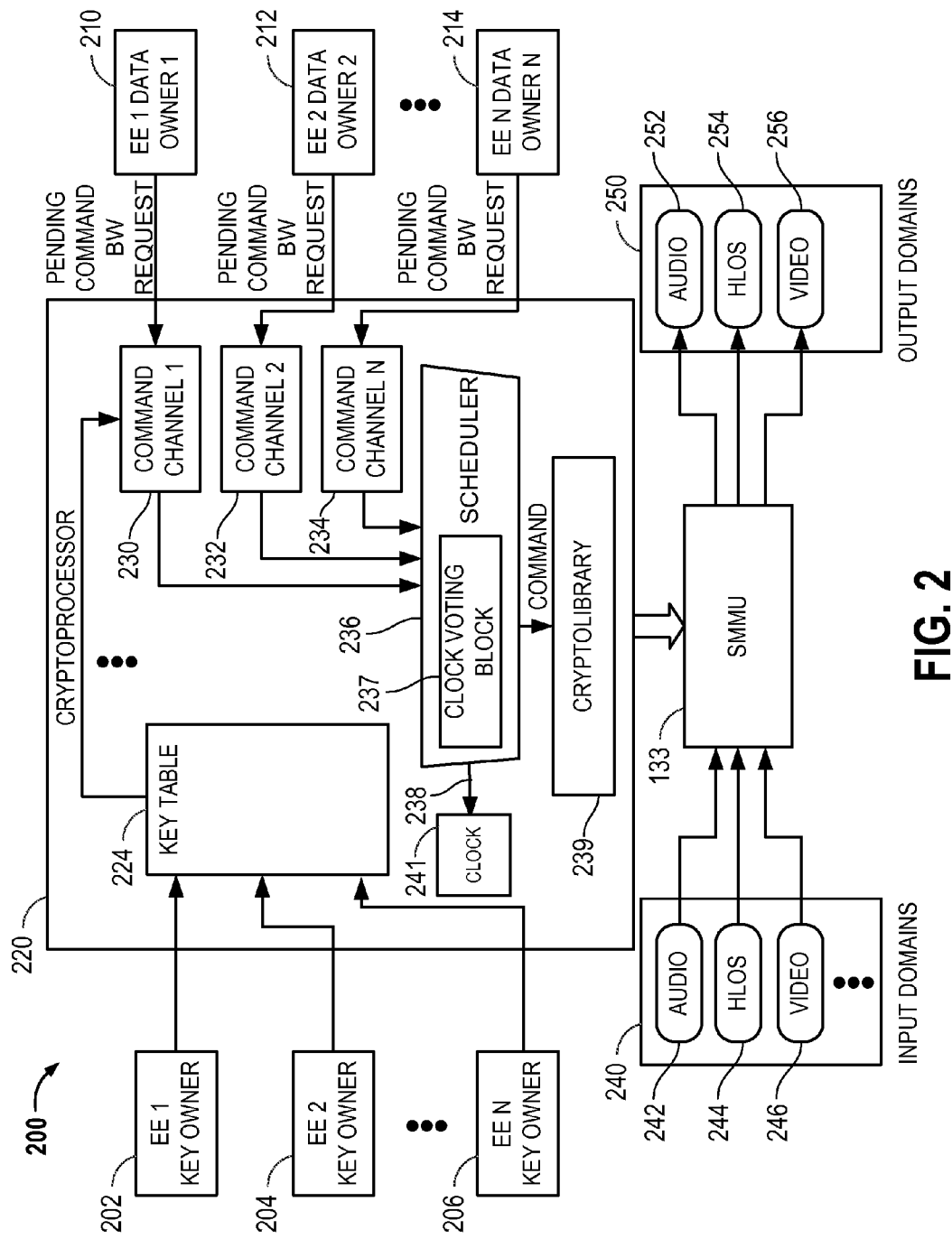
FIG. 2 is an example of a computing environment that includes a processor and a scheduler to set the speed of a clock.

With reference to FIG. 2, an example of a computing environment 200 implementable by computing device 100 that includes a processor 220, such as a cryptoprocessor, to set the speed of a clock, in which aspects of the invention may be practiced, will be hereinafter described. As will be described in more detail later, the use of a cryptoprocessor 220 to set the speed of a clock is just one example of a processor that may be utilized to set the speed of a clock, and that any type of processor may be utilized to implement the embodiments of the invention to set the speed of a clock.

Continuing with this example, cryptoprocessor 220 may perform computationally intensive encoding and decoding of information via the use of keys. Cryptoprocessor 220 may be either a co-processor that performs computationally intensive encoding and decoding of information for a CPU (or other processor) based upon an extended language or may be a cryptoengine that is a separate piece of hardware (e.g., an accelerator processor) that is run by a dedicated software driver for the encoding and decoding of information. In this example, cryptoprocessor 220 is a cryptoengine, and examples hereinafter described, will be in the context of implementation by a cryptoengine. However, as should be apparent to those of skill in the art, these same implementations may be similarly performed by a co-processor. In this example implementation, various execution environment key owners (EE1-EEN) 202, 204, 206 that control keys to encrypt and decrypt data operate in cooperation with various execution environment data owners (EE1-EEN) 210, 212, 214. The execution environments utilizing keys may securely communicate data for input and output by the computing device. In particular, data may be encrypted and decrypted via keys stored in key table 224 of the cryptoprocessor 220. As an example, keys from key table 224 that are assigned to EE data owners (210, 212, 214) may be transmitted to their respective command channels to implement pending commands (e.g., encrypt or decrypt). Additionally, or in the alternative, keys stored in the key table may be transmitted to a cryptolibrary 239 for use in the encryption or decryption of data. In any event, commands from EE data owners (210, 212, 214) through command channels (230, 232, 234) to encrypt or decrypt data performed by the cryptoprocessor 220 are performed such that encrypted or decrypted data may be provided to input domains 240 or output domains 250 via SMMU 133.

As will be described in more detail later, in one embodiment, a scheduler 236 of the cryptoprocessor 220 is configured to: receive a plurality of votes for requested bandwidths (BW requests) from a plurality of different execution environments (e.g., EE data owners 210, 212, 214); sum the requested bandwidths in a clock voting block 237 of the scheduler 236; and set the speed of a clock 241 (e.g., the clock speed) based upon the sum of the requested bandwidths, e.g., referred to as the clock vote 238. Based upon this, the encryption/decryption commands from the EE data owners (210, 212, 214) are performed at the total sum of the speed. For example, if there are three EE bandwidth request votes [e.g., for 100 Mhz, 100 Mhz, and 200 Mhz] from the EE data owners (210, 212, 214), the scheduler 236 schedules the speed of the clock 241 to be 400 Mhz (i.e., the total sum). In this way, the average performance of all the EE data owners (210, 212, 214) does not need to be changed due to the unmanaged concurrency of events. It should be appreciated that summing the requested bandwidth requests in the clock voting block 237 is only one example of a type of a function that may be utilized, and that any type of function that takes into account the demand of activity requested by all the users, which is the utilized to adjust the clock 241 accordingly, may be utilized.

As one example implementation, input domains 240 include audio data 242, high level operating system data (HLOS) 244, and video data 246, whereas similarly, example output domains 250 include audio data 252, high level operating system data (HLOS) 254, and video data 256. It should be appreciated that these are just example domains, and many different types of domains may be utilized (e.g., enterprise, modem, etc.). Furthermore, many different types of execution environments may be utilized, the previously-described ones being merely examples. In one particular example, execution environment 1 may be for video data and may include EE1 key owner 202 and EE1 data owner 1 210. Input video data 246 for data owner 201 may need to be decrypted by cryptoprocessor 220 with a key in key table 224 associated with the EE1 key owner so that it may be displayed in the output domain 256. Continuing with this example, a video execution environment (e.g., EE1 key owner 202 and EE1 data owner 210) may request that encrypted video data 246 be decrypted by cryptoprocessor 220 with the associated key of the key table 224 for the video execution environment so that the video data 256 can be output to the output domain 250 for display. The command channel 1 230 may include the decrypt command implemented with the key of key table 224 and/or the cryptolibrary 239.

Moreover, the scheduler 236 of the cryptoprocessor 220 may be utilized to receive the plurality of votes for requested bandwidths (BW requests) from the plurality of different execution environments (e.g., EE data owners 210, 212, 214) (e.g., [100 Mhz, 100 Mhz, and 200 Mhz]); sum the requested bandwidths in the clock voting block 237; and set the speed of a clock 241 (e.g., the clock speed) based upon the sum of the requested bandwidths, e.g., referred to as the clock vote 238 (e.g., 400 Mhz). Based upon this, the encryption/decryption commands from the EE data owners (210, 212, 214) are performed at the total sum of the speed. Accordingly, as example, for a video execution environment (e.g., EE1 key owner 202 and EE1 data owner 210) may have encrypted video data 246 decrypted by cryptoprocessor 220 at a clock rate of 400 Mhz so that the video data 256 can be output to the output domain 250 for display whereas the other execution environments may likewise (e.g., EE2 key owner 202/EE2 data owner 210 (e.g., audio) and EEN key owner 206/EEN data owner 214 (e.g., HLOS)) may likewise have encrypted data decrypted by cryptoprocessor 220 at a clock rate of 400 Mhz so that the related data can be outputted to the output domain 250.

It should be appreciated that this is but one example of the operation of a cryptoprocessor (that may be used to encrypt or decrypt data) and that many different types of execution environments, types of data, types of domains, etc., may be utilized with the cryptoprocessor or any type of processor. Further it should be appreciated, that the use of a cryptoprocessor to set the speed of a clock is just one example of a processor 220 that may be utilized to set the speed of a clock, and that any type of processor may be utilized to implement the embodiments of the invention to set the speed of a clock.

Figures 3, 4:
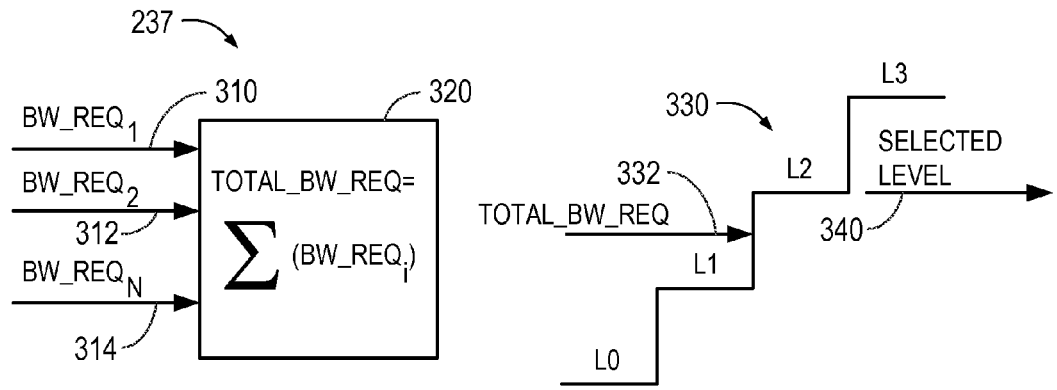
FIG. 3 is an example of a clock voting block of a scheduler.
FIG. 4 is an example of a scheduler utilizing requested bandwidths for generalized clock speeds from data owners.

With additional reference to FIG. 3, an example of a clock voting block 237 of scheduler 236 is described. To begin with, in one embodiment, it should be appreciated that the scheduler 236 may operate using any fair-sharing algorithm. One such example is round-robin fashion, in which for each command from a command channel (e.g., 230, 232, 234) for each EE data owner (e.g., 210, 212, 214), the scheduler pauses for the current command being serviced and then serves the next one. For example, once the quota is reached (e.g., 32 KB) for the current command, if any pending command is set, the next pending command is serviced. In this way, every command channel receives between 100% to 1/N of the processor's performance, in which N is the number of ports/command channels in the pending state. In this way, starvation is prevented and fairness to the command channels may be provided. As shown in FIG. 3, clock voting block 237 of the scheduler may receive a plurality of bandwidth requests (e.g., bandwidth requests 1-N 310, 312, and 314) from a plurality of different execution environment data owners (e.g., 210, 212, and 214) and by utilizing a summing function 320 may sum the requested bandwidth request to calculate a total bandwidth request [e.g., $TOTAL\_BW\_REQ = \Sigma(BW\_REQ_i)$].

Further, in one embodiment, the clock may include leveled speeds 330, such that based upon the sum of the bandwidth requests (TOTAL_BW_REQ 332), the clock voting block 237 of the scheduler 236 is configured to select the next highest leveled speed. As an example, as shown in FIG. 3, bandwidth may be predefined at certain levels (e.g., Level0—0 Mhz, Level1—200 Mhz, Level2—400 Mhz, Level3—600 Mhz, etc.). In this example, if there are three EE data owner votes for bandwidth request for 100 Mhz, 100 Mhz, and 150 Mhz, respectively, the clock voting block 237 calculates the total bandwidth request 332 as 350 MHz and selects the next highest level 340 of bandwidth: Level2—400 Mhz. Therefore, the next highest leveled speed for the speed of the clock 241 is selected (e.g., 400 Mhz). It should be appreciated that embodiments the scheduler 236 may be implemented in hardware or software. Also, again it should be appreciated that summing the requested bandwidth requests in the clock voting block 237 is only one example of a type of a function that may be utilized, and that any type of function that takes into account the demand of activity requested by all the users, which is the utilized to adjust the clock 241 accordingly, may be utilized.

With additional reference to FIG. 4, an example of the scheduler 236 utilizing requested bandwidths for generalized clock speeds from EE data owners is described. In this embodiment, each EE data owner (e.g., 210, 212, 214) transmits a bandwidth request or vote through their respective command channel (e.g., 230, 232, 234) for a generalized clock speed (e.g., low, medium, or high) to the scheduler 236. Based upon the requested generalized clock speeds received (e.g., low, medium, or high), the scheduler 236 may select the next highest level generalized clock speed (e.g., which serves as the clock vote) for the clock 241. Thus, based upon the requested generalized clock speeds received (e.g., low, medium, or high), the scheduler 236 may select clock speeds at the next level from the combined votes. Table 400 of FIG. 4 provides different examples.

As one example, if EE1 410=Low, EE2 412=Low, and EE3 414=Low, then scheduler 236 sets the clock vote for the clock rate 416 for the speed of the clock 241 to be set to Medium. As another example, if EE1 410=Low, EE2 412=Low, and EE3 414=Medium, then scheduler 236 sets the clock vote for the clock rate 416 for the speed of the clock 241 to be set to High. As yet another example, if EE1 410=Low, EE2 412=Medium, EE3 414=High, then scheduler 236 sets the clock vote for the clock rate 416 for the speed of the clock 241 to be set to High.

As previously described, processor 220 that implements the previously described functionality of scheduler 236 to set the speed of a clock (e.g., the clock speed) may be a cryptoprocessor for implementing encoding and decoding, or any other type of processor to implement the functions of the processor at the speed of the clock set by the scheduler 236. Accordingly, the scheduler 236 for any type of processor may be configured to: receive a plurality of votes for requested bandwidths (BW requests) from a plurality of different execution environments (e.g., EE data owners 210, 212, 214); sum the requested bandwidths in a clock voting block 237 of the scheduler 236; and set the speed of a clock 241 based upon the sum of the requested bandwidths, e.g., referred to as the clock vote 238. Based upon this, any type of commands from EE data owners (210, 212, 214) may be performed at the total sum of the speed, as previously described in detail, for any type of processor.

Figure 5:
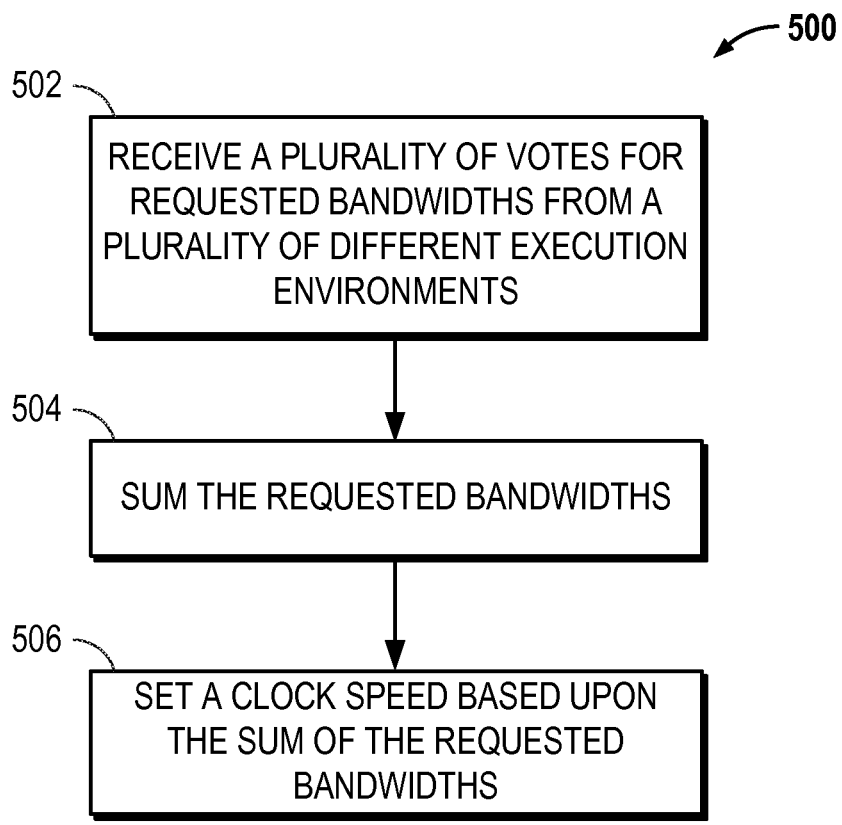
FIG. 5 is a flow diagram illustrating an example of a process to set the speed of a clock.

With additional reference to FIG. 5, FIG. 5 is a flow diagram illustrating an example of a method process 500 to set the speed of a clock, according to one embodiment of the invention. At block 502, a plurality of votes for requested bandwidths (BW requests) from a plurality of different execution environments is received. Next, at block 504, the requested bandwidths are summed. At block 506, the clock speed is set based upon the sum of the requested bandwidths. Based upon this, any type of commands from any type of EE data owners may be performed at the total sum of the speed, as previously described in detail, for any type of processor.

It should be appreciated that aspects of the invention previously described may be implemented in conjunction with the execution of instructions by processors 220 (e.g., a general processor, a cryptoprocessor, or any type of processor) of the device (e.g., computing device 100), as previously described. Particularly, circuitry of the devices, including but not limited to processors, may operate under the control of a program, routine, or the execution of instructions to execute methods or processes in accordance with embodiments of the invention (e.g., the processes and functions of FIGS. 3-5). For example, such a program may be implemented in firmware or software (e.g. stored in memory and/or other locations) and may be implemented by processors and/or other circuitry of the devices. Further, it should be appreciated that the terms processor, microprocessor, circuitry, controller, etc., refer to any type of logic or circuitry capable of executing logic, commands, instructions, software, firmware, functionality, etc It should be appreciated that when the devices are mobile or wireless devices that they may communicate via one or more wireless communication links through a wireless network that are based on or otherwise support any suitable wireless communication technology. For example, in some aspects the wireless device and other devices may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, 3G, LTE, Advanced LTE, 4G, CDMA, TDMA, OFDM, OFDMA, WiMAX, and WiFi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a mobile wireless device may therefore wirelessly communicate with other mobile devices, cell phones, other wired and wireless computers, Internet web-sites, etc.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), a tablet, a mobile computer, a laptop computer, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a wired computer, a fixed computer, a desktop computer, a server, a point-of-sale device, a set-top box, or any other suitable device. These devices may have different power and data requirements In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a WiFi station) to access the other network or some other functionality.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method to set a clock speed comprising:
receiving a plurality of votes for requested bandwidths from a plurality of different execution environment data owners;
summing the requested bandwidth requests; and
setting the clock speed of a cryptoprocessor based upon the sum of the requested bandwidth requests.

2. The method of claim 1, wherein, the clock includes leveled speeds.

3. The method of claim 2, further comprising, based upon the sum of the requested bandwidth requests, selecting the next highest leveled speed for the clock speed.

4. The method of claim 1, wherein, each of the requested bandwidth requests is for a generalized clock speed.

5. The method of claim 4, wherein, the generalized clock speeds include levels of at least one of low, medium, or high.

6. The method of claim 5, further comprising, based upon the requested generalized clock speeds, selecting the next highest level generalized clock speed for the speed of the clock.

7. A non-transitory computer-readable medium including code that, when executed by a processor, causes the processor to:
receive a plurality of votes for requested bandwidths from a plurality of different execution environment data owners;
sum the requested bandwidth requests; and
set a clock speed of a cryptoprocessor based upon the sum of the requested bandwidth requests.

8. The computer-readable medium of claim 7, wherein, the clock includes leveled speeds.

9. The computer-readable medium of claim 8, further comprising code to, based upon the sum of the requested bandwidth requests, select the next highest leveled speed for the clock speed.

10. The computer-readable medium of claim 7, wherein, each of the requested bandwidth requests is for a generalized clock speed.

11. The computer-readable medium of claim 10, wherein, the generalized clock speeds include levels of at least one of low, medium, or high.

12. The computer-readable medium of claim 11, further comprising code to, based upon the requested generalized clock speeds, select the next highest level generalized clock speed for the speed of the clock.

13. A computing device comprising:
a processor; and
a scheduler of the processor, the scheduler configured to:
receive a plurality of votes for requested bandwidths from a plurality of different execution environment data owners;
sum the requested bandwidth requests; and
set a clock speed of a cryptoprocessor based upon the sum of the requested bandwidth requests.

14. The computing device of claim 13, wherein, the clock includes leveled speeds.

15. The computing device of claim 14, wherein, based upon the sum of the requested bandwidth requests, the scheduler is configured to select the next highest leveled speed for the clock speed.

16. The computing device of claim 13, wherein, each of the requested bandwidth requests is for a generalized clock speed.

17. The computing device of claim 16, wherein, the generalized clock speeds include levels of at least one of low, medium, or high.

18. The computing device of claim 17, wherein, based upon the requested generalized clock speeds, the scheduler is configured to select the next highest level generalized clock speed for the speed of the clock.

19. A computing device comprising:
means for receiving a plurality of votes for requested bandwidths from a plurality of different execution environment data owners;
means for summing the requested bandwidth requests; and
means for setting a clock speed of a cryptoprocessor based upon the sum of the requested bandwidth requests.

20. The computing device of claim 19, wherein, the clock includes leveled speeds.

21. The computing device of claim 20, further comprising based upon the sum of the requested bandwidth requests, means for selecting the next highest leveled speed for the clock speed.

22. The computing device of claim 19, wherein, each of the requested bandwidth requests is for a generalized clock speed.

23. The computing device of claim 22, wherein, the generalized clock speeds include levels of at least one of low, medium, or high.

24. The computing device of claim 23, wherein, based upon the requested generalized clock speeds, means for selecting the next highest level generalized clock speed for the speed of the clock.

25. The method of claim 1, further comprising:
receiving, from at least one execution environment data owner, a command to encrypt or decrypt data; and
encrypting or decrypting the data using at least one key, wherein the encrypting or decrypting is performed by the cryptoprocessor at the clock speed.

* * * * *